(12) United States Patent
Wang et al.

(10) Patent No.: US 10,572,293 B2
(45) Date of Patent: *Feb. 25, 2020

(54) NODE IN CLUSTER MEMBERSHIP MANAGEMENT PROTOCOL

(71) Applicant: Nicira, Inc., Palo Alto, CA (US)

(72) Inventors: Ziyou Wang, Beijing (CN); Pankaj Thakkar, Palo Alto, CA (US); Jianjun Shen, Palo Alto, CA (US); Yusheng Wang, Beijing (CN); Donghai Han, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 15/842,912

(22) Filed: Dec. 15, 2017

(65) Prior Publication Data

US 2019/0188018 A1  Jun. 20, 2019

(51) Int. Cl.
| | |
|---|---|
| G06F 9/455 | (2018.01) |
| G06F 11/30 | (2006.01) |
| G06F 11/07 | (2006.01) |
| H04L 29/08 | (2006.01) |

(52) U.S. Cl.
CPC ...... *G06F 9/45558* (2013.01); *G06F 11/0709* (2013.01); *G06F 11/3006* (2013.01); *H04L 67/10* (2013.01); *G06F 2009/45587* (2013.01)

(58) Field of Classification Search
CPC ... H04L 67/10; G06F 11/0709; G06F 11/3006
See application file for complete search history.

(56) References Cited

U.S. PATENT DOCUMENTS

| 6,449,641 | B1 | 9/2002 | Moiin et al. | |
|---|---|---|---|---|
| 7,370,223 | B2 * | 5/2008 | Olmstead | H04L 67/10 714/3 |
| 8,599,719 | B1 * | 12/2013 | Doherty | H04W 8/005 370/254 |
| 8,601,101 | B1 * | 12/2013 | Singh | H04L 69/40 370/254 |
| 8,924,570 | B2 * | 12/2014 | Stevens | H04W 84/18 709/227 |
| 9,930,704 | B2 * | 3/2018 | Lu | H04W 12/06 |
| 10,153,918 | B2 * | 12/2018 | Olmsted-Thompson | H04L 45/02 |
| 10,268,506 | B2 * | 4/2019 | Demchenko | G06F 9/4843 |

(Continued)

FOREIGN PATENT DOCUMENTS

WO   WO-0182678 A2 * 11/2001  ......... H04L 41/0618

*Primary Examiner* — Lashonda T Jacobs
(74) *Attorney, Agent, or Firm* — Su IP Consulting (57) ABSTRACT

A method for a node to become a member of a cluster includes, when the node is in an initialization state, refraining from starting any service for the cluster, rejecting any reconfiguration request from a coordinator of the cluster, and determining if a local copy of a member list is out-of-date. When the local member list is up-to-date, the method includes advancing to an observer state or a participant state depending on if the node is in the member list. When the local copy of the member list is out-of-date, the method includes waiting to receive the member list, updating the local member list to be equal to the member list, persisting the local member list, recording the local member list as up-to-date, and advancing to an observer state or a participant state depending if the node is in the member list.

21 Claims, 5 Drawing Sheets

(56) References Cited

U.S. PATENT DOCUMENTS

| | | | |
|---|---|---|---|
| 2002/0042693 A1 | 4/2002 | Kampe et al. | |
| 2002/0049845 A1* | 4/2002 | Sreenivasan | H04L 69/40 709/226 |
| 2003/0149735 A1* | 8/2003 | Stark | H04L 29/06 709/208 |
| 2005/0021574 A1* | 1/2005 | Miller | G06F 11/1662 |
| 2005/0135343 A1* | 6/2005 | Karino | H04L 69/40 370/352 |
| 2007/0109979 A1* | 5/2007 | Fu | H04L 12/1813 370/261 |
| 2007/0124380 A1* | 5/2007 | Carr | H04L 67/1095 709/204 |
| 2008/0008090 A1* | 1/2008 | Gilfix | H04L 47/15 370/230 |
| 2008/0040628 A1* | 2/2008 | Mandal | H04L 41/0677 714/4.1 |
| 2008/0201403 A1* | 8/2008 | Andersson | H04L 45/02 709/202 |
| 2011/0138475 A1* | 6/2011 | Gordon | H04L 9/085 726/26 |
| 2011/0283149 A1* | 11/2011 | Richmond | G06F 11/0709 714/39 |
| 2014/0289197 A1* | 9/2014 | Webber | G06F 16/275 707/632 |
| 2016/0087833 A1* | 3/2016 | Donahue | G06F 16/278 709/221 |
| 2019/0149418 A1* | 5/2019 | Bertsche | H04L 41/0893 707/625 |
| 2019/0190783 A1 | 6/2019 | Wang et al. | |

* cited by examiner

NODE IN CLUSTER MEMBERSHIP MANAGEMENT PROTOCOL

BACKGROUND

A software-defined data center may include a control cluster that "centralizes" certain functions with a relatively small, distributed cluster of nodes to manage the data center components. One of the problems faced by the control cluster is how to manage its membership in simple, reliable, and easy-to-implement way.

A cluster should enforce a consistent membership view on all nodes, including after the cluster dynamically adds and removes nodes. Many existing clusters use coordination services, such as Zookeeper, to handle cluster reconfiguration. Unfortunately, these coordination services also need to form their own clusters and therefore face the very same problems as to how to maintain a consistent membership view. For dynamic configuration, these coordination services have strict requirements and limitations when used in practice. For example, Zookeeper requires manual recovery of the cluster if the coordination service loses its quorum. However, customers do not wish to manually manage a cluster's membership and expects this task to be automated.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

In examples of the present disclosure, a coordinator service changes a cluster's membership at runtime. A coordinator automatically negotiates with all the nodes that are or wish to be members of the cluster to change the membership (reconfiguration) in a simple but consistent manner. Network, software, and hardware failures are all possible during reconfiguration since the cluster is distributed and the nodes may connect to each other through unreliable networks. The coordinator avoids inconsistent view of the membership from such failures when a node is added or removed as a member of the cluster. The coordinator service is simple, reliable, and easy to implement.

Figure 1:
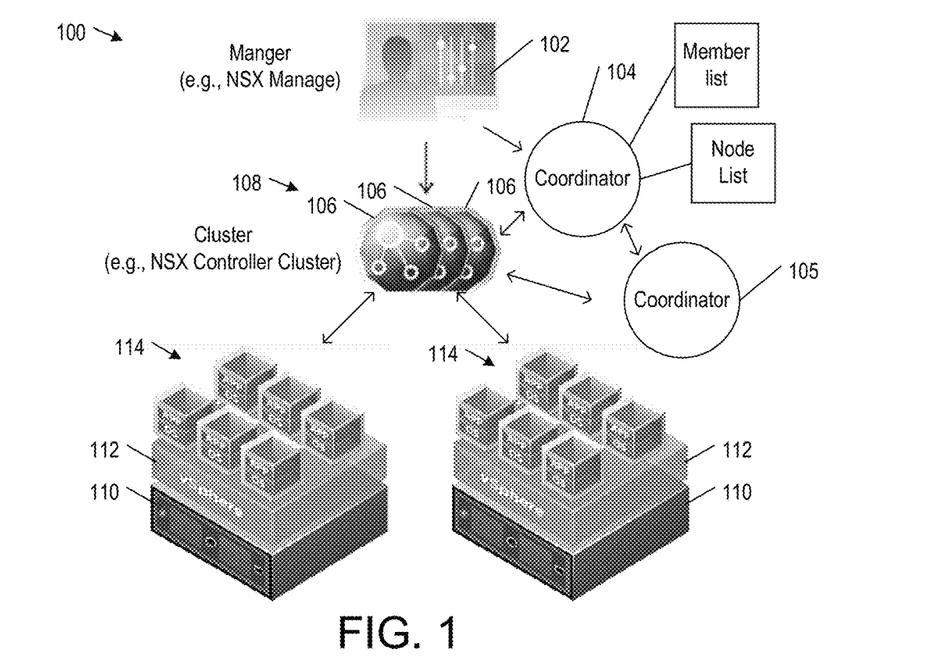
FIG. 1 is a block diagram illustrating the coordinator service applied to a virtualized computing system according to examples of the present disclosure.

FIG. 1 is a block diagram illustrating the coordinator service applied to a virtualized computing system 100 according to examples of the present disclosure. In other examples, the coordinator service may be applied to a physical computing system.

System 100 includes a centralized manager 102, a cluster coordinator 104, nodes 106 that are or wish to be members of a cluster 108, and hosts 110 each running a hypervisor 112 for implementing virtual machines (VMs) 114. Manager 102 creates and manages the components of system 100. Cluster coordinator 104 manages the membership of cluster 108. Cluster 108 may be a controller cluster, which is a control plane component that manages the switching and routing modules in hypervisors 112 that connect VMs 114. Manager 102, cluster coordinator 104, and nodes 106 may be virtual appliances on host computers (not shown).

Figure 2:
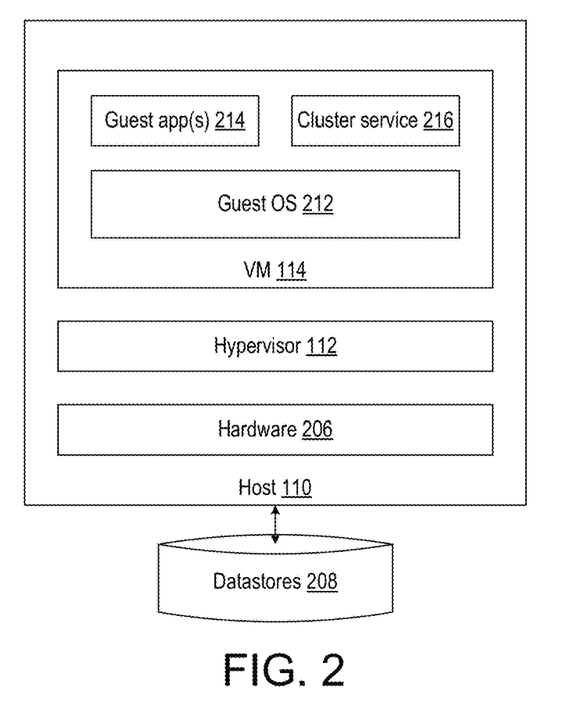
FIG. 2 is a block diagram of a host computer of FIG. 1 in examples of the present disclosure.

FIG. 2 is a block diagram of host computer 110 in examples of the present disclosure. Host computer 110, also referred to as a host, runs hypervisor 112 to create and run VMs 114. Host 110 includes suitable hardware 206 (physical memory, processor, local storage, and network interface cards) to support VMs 114. Host 110 stores the VM data in a datastore 208, which may be local or remote.

A VM 114 represents a software implementation of a physical machine. Virtual resources are allocated to VM 114 to support a guest operating system (OS) 212 running on the VM and applications running on the guest OS. Corresponding to hardware 206, the virtual resources may include virtual memory, virtual processor, virtual local storage, and virtual network interface cards. Guest OS 212 may be implemented using any suitable operating system, such as Microsoft Windows, Linux, etc. A cluster service 216 runs on guest OS 212 or may be part of the guest OS. Depending on the role of VM 114, cluster service 216 may be the software for cluster coordinator 104 or node 106 (FIG. 1).

In examples of the present disclosure, coordinator 104 (FIG. 1) is the source of truth of the cluster membership view. A node 106 (FIG. 1) can join the cluster or can be removed from the cluster only when coordinator 104 successfully completes a reconfiguration process with all the nodes that are or wish to be members of cluster 108 (FIG. 1). Coordinator 104 maintains and persists a node list and a member list. The node list includes all the nodes that are or want to be members of cluster 108. An administrator may use manager 102 (FIG. 1) to create and edit the node list to add or remove members of cluster 108 (FIG. 1). In the node list, the nodes are provided with their locations and other necessary information for communication with each other. The member list includes all the nodes that are successfully configured or reconfigured as members of the cluster. Coordinator 104 persists these two lists to nonvolatile memory (e.g., datastore 208 in FIG. 2) for recovery purposes in case the coordinator experiences a failure.

Figure 3:
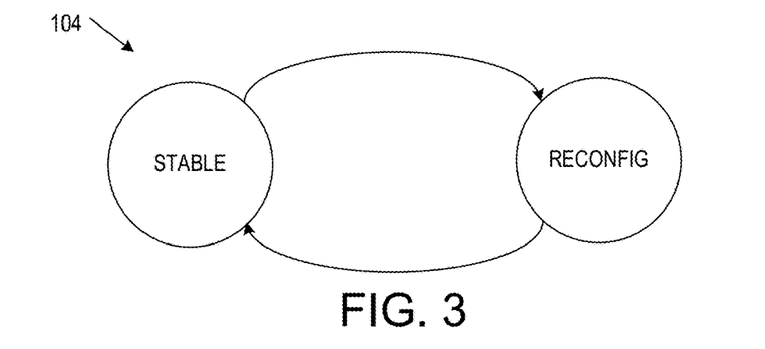
FIG. 3 is a block diagram illustrating two states of a cluster coordinator of FIG. 1 in examples of the present disclosure.

FIG. 3 is a block diagram illustrating two states of cluster coordinator 104 in examples of the present disclosure. Coordinator 104 is in a STABLE state when the node list is equal to the member list. In other words, no node is waiting to join or leave the cluster. When the node list is not equal to the member list, the coordinator advances from the STABLE state to a RECONFIG state to attempt a reconfiguration process that changes the cluster membership. In contrast to the STABLE state, there is at least one node waiting to join or leave the cluster.

In the STABLE state, any node in the node list may actively query the member list from coordinator 104 or the coordinator may periodically push the member list to all the nodes in the node list. Coordinator 104 does not publish the member list once it enters the RECONFIG state to attempt reconfiguration.

In the RECONFIG state, coordinator 104 sends a reconfiguration request to all the nodes in the node list. Coordinator 104 assigns a unique change ID to identify the current reconfiguration attempt and includes the change ID in the reconfiguration request. All the nodes in the node list must acknowledge the reconfiguration request. When coordinator 104 does not receive reconfiguration acknowledgments with the correct change ID from all the nodes in the node list within a timeout period, it will send an abort message with the change ID to all the nodes in the node list and return to the STABLE state. After returning to the STABLE state, coordinator 104 may attempt another reconfiguration. When all the nodes in the node list acknowledge the reconfiguration request with the correct change ID, coordinator 104 updates the member list equal to the node list and persists the member list to nonvolatile memory (e.g., datastore 208 in FIG. 2). After the member list is successfully updated and persisted, coordinator 104 then notifies all the nodes in the node list about the updated member list with the change ID and returns to the STABLE state.

Figure 4:
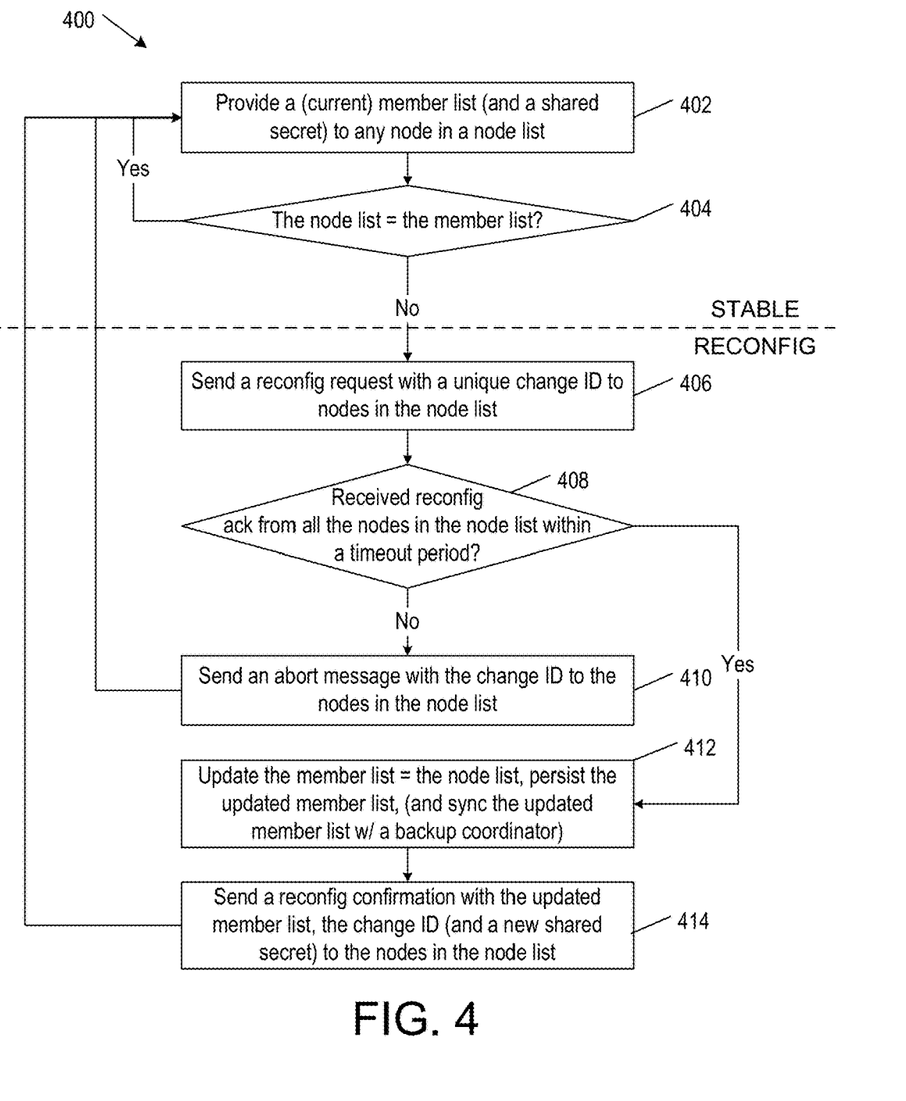
FIG. 4 is a block diagram illustrating a flowchart of a method to implement the cluster coordinator of FIGS. 1 and 3 in some examples of the present disclosure.

FIG. 4 is a block diagram illustrating a flowchart of a method 400 to implement cluster coordinator 104 (FIGS. 1 and 3) in some examples of the present disclosure. Method 400, and any method described herein, may be implemented as instructions encoded on a computer-readable medium that is to be executed by a processor in a computer system. Method 400, and any method described herein, may include one or more operations, functions, or actions illustrated by one or more blocks. Although the blocks are illustrated in sequential orders, these blocks may also be performed in parallel, and/or in a different order than those described herein. In addition, the various blocks may be combined into fewer blocks, divided into additional blocks, and/or eliminated based upon the desired implementation. Method 400 includes blocks 402 and 404 when coordinator 104 is in the STABLE state, and blocks 406, 408, 410, 412, and 414 when the coordinator is in the RECONFIG state. Method 400 may begin in block 402.

In block 402, coordinator 104 provides the (current) member list to any node in the node list. Coordinator 104 may provide the member list by pushing the member list to all the nodes in the node list. Coordinator 104 may also provide the member list by responding to a request for the member list from any node in the node list. Along with the member list, coordinator 104 may also send a shared secret for secured connections between all the nodes in the member list as explained in more detail later. Block 402 may be followed by block 404.

In block 404, coordinator 104 determines if the node list is equal to the member list. If so, block 404 may loop back to block 402. Otherwise block 404 may be followed by block 406 where coordinator 104 advances to the RECONFIG state to change the membership of cluster 108 (FIG. 1).

In block 406, coordinator 104 sends a reconfiguration request to the nodes (e.g., nodes 106 in FIG. 1) in the node list. The reconfiguration request includes a unique change ID to identify the current reconfiguration attempt. Block 406 may be followed by block 408.

In block 408, coordinator 104 determines if it receives reconfiguration acknowledgments with the correct change ID from all the nodes in the node list within a timeout period. If not, block 408 may be followed by block 410. Otherwise block 408 may be followed by block 412.

In block 410, coordinator 104 sends an abort message with the change ID to all the nodes in the node list. Block 410 may loop back to block 402 where coordinator 104 returns to the STABLE state.

In block 412, coordinator 104 updates the member list to be equal to the node list and persists the updated member list to nonvolatile memory (e.g., datastore 208). Coordinator 104 may also synchronize the updated member list with a backup coordinator 105 (FIG. 1) as explained in more detail later. Block 412 may be followed by block 414.

In block 414, coordinator 104 sends a reconfiguration confirmation to all the nodes in the node list. The reconfiguration confirmation includes the change ID and the updated member list. The reconfiguration confirmation may also include a new shared secret for secured connections between all the nodes in the member list as explained in more detail later. Block 414 may loop back to block 402 where coordinator 104 returns to the STABLE state.

A node 106 (FIG. 1) that is or wish to be a member of cluster 108 (FIG. 1) maintains and persists an update flag and a local copy of the member list ("local member list"). When node 106 starts for the first time, the update flag defaults to true and the local member list is empty. The update flag indicates if the local member list is out-of-date (i.e., different from the member list persisted by coordinator 104). The local member list is out-of-date when (1) node 106 first starts or (2) when the node receives a reconfiguration request from coordinator 104, which indicates the coordinator is changing the cluster membership.

Figure 5:
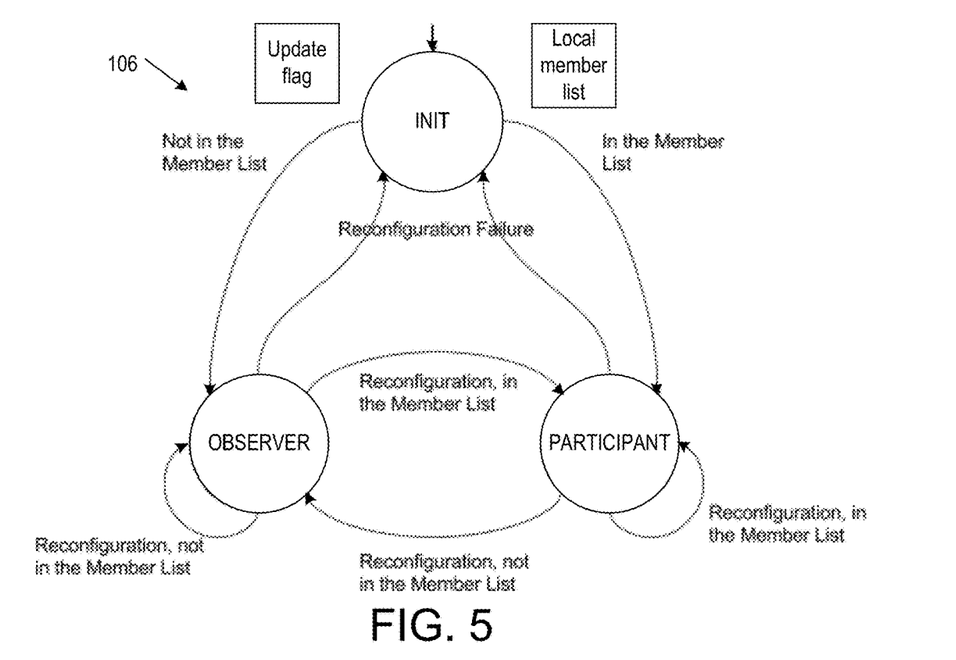
FIG. 5 is a block diagram illustrating three states of a node of FIG. 1 in examples of the present disclosure.

FIG. 5 is a block diagram illustrating three states of a node 106 in examples of the present disclosure. When node 106 starts, it enters an initialization (INIT) state. Node 106 checks its update flag in nonvolatile memory (e.g., datastore 208 in FIG. 2). When the update flag is true, node 106 stays in the INIT state until it receives the (current) member list from coordinator 104 (FIGS. 1 and 3) or a backup coordinator 105 (FIG. 1) as explained later in more detail. After receiving the member list from coordinator 104 or backup coordinator 105, node 106 updates the local member list to be equal to the member list, persists the local member list to nonvolatile memory (e.g., datastore 208), changes the update flag to false, and advances to either an OBSERVER state or a PARTICIPANT state depending on if it is in the member list.

When the update flag is set to false, node 106 can use (trust) its local member list to determine if it is in the member list because the local member list is up-to-date (i.e., same as the member list persisted by coordinator 104). In the INIT state, node 106 does not start any real cluster service because it does not know if it is part of the cluster or not. Node 106 also rejects all reconfiguration requests sent by coordinator 104.

In the OBSERVER state, node 106 is not in the member list yet. Node 106 still may not communicate with the other nodes in cluster 108 (FIG. 1) but it is ready to perform reconfiguration with coordinator 104.

In the PARTICIPANT state, node 106 is in the member list. Node 106 may start and participate all cluster related services without introduce any inconsistent problem.

In the OBSERVER and the PARTICIPANT states, once node 106 receives a reconfiguration request from coordinator 104, it changes the update flag in nonvolatile memory to true and sends back a reconfiguration confirmation with the same change ID in the request. As described above, the local member list is out-of-date when node 106 receives a reconfiguration request from coordinator 104, which indicates the coordinator is changing the cluster membership. Node 106 then waits for coordinator 104 to confirm or abort the reconfiguration attempt until a timeout occurs. If the timeout occurs before node 106 gets any response from coordinator 104, it determines the reconfiguration attempt has failed and returns to the INIT state. If node 106 receives the reconfiguration confirmation with the change ID before timeout occurs, it updates the local member list in nonvolatile memory and changes the update flag in nonvolatile memory to false to indicate the local member list is up-to-date. If node 106 receives an abort message with the change ID before the timeout occurs, it changes the update flag in nonvolatile memory to false to indicate the local member list is up-to-date (though unchanged). Based on the member list, node 106 determines if it is a member of cluster 108 and may advance to another state when appropriate.

Figure 6:
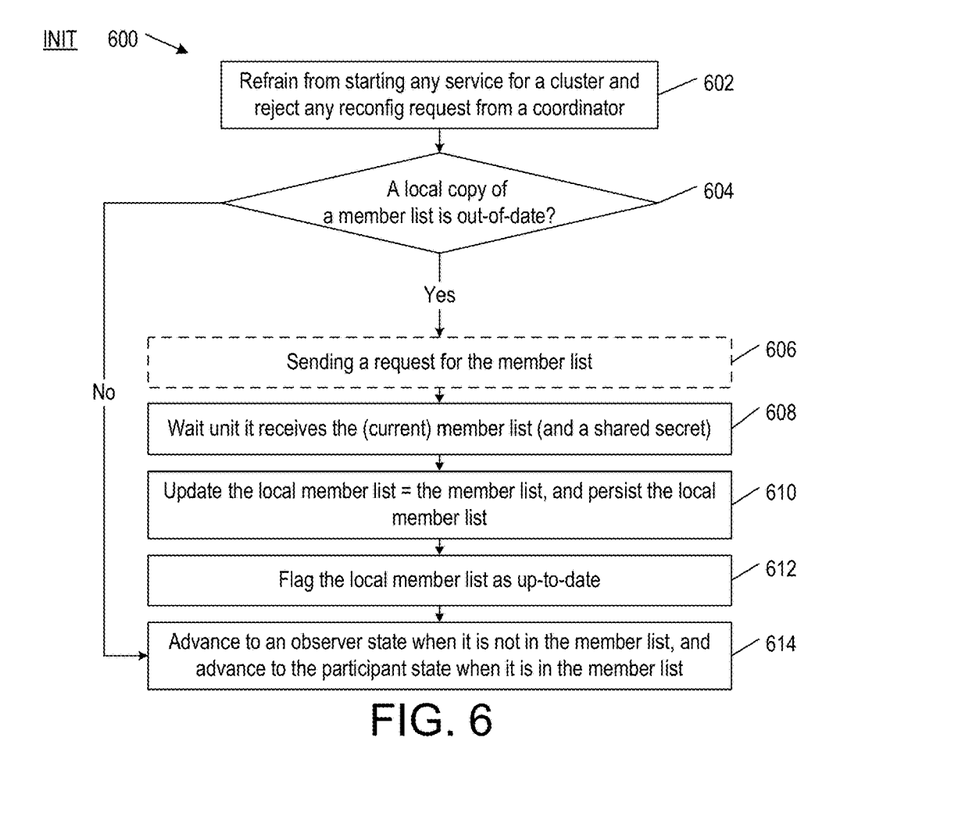
FIG. 6 is a block diagram illustrating a flowchart of a method to implement node 106 of FIGS. 1 and 5 in the initialization (INIT) state in some examples of the present disclosure.

FIG. 6 is a block diagram illustrating a flowchart of a method 600 to implement node 106 (FIGS. 1 and 5) in the INIT state in some examples of the present disclosure. Method 600 may begin in block 602.

In block 602, node 106 refrains from starting or participating in any cluster related service, and rejects any reconfiguration request from coordinator 104 (FIGS. 1 and 3). Block 602 may be followed by block 604.

In block 604, node 106 determines if the local member list is out-of-date. As described above, the local member list is out-of-date when (1) node 106 first starts and (2) when the node receives a reconfiguration request from coordinator 104, which indicates the coordinator is changing the cluster membership. To make this determination, node 106 determines if its update flag in nonvolatile memory (e.g., datastore 208 in FIG. 2) is true. If so, block 604 may be followed by optional block 606. Otherwise block 604 may be followed by block 614.

In optional block 606, node 106 sends a request for the member list to coordinator 104. Block 606 may be followed by block 608.

In block 608, node 106 waits until it receives the (current) member list. The member list may come from coordinator 104 or the backup coordinator 105 (FIG. 1) as explained in more detail later. Along with the member list, node 106 may also receive a shared secret for secured connections between all the nodes in the member list as explained in more detail later. Block 608 may be followed by block 610.

In block 610, after node 106 receives the member list, it updates the local member list to be equal to the member list and persist the local member list to nonvolatile memory (e.g., datastore 208 in FIG. 2). Block 610 may be followed by block 612.

In block 612, node 106 records (e.g., flags) the local member list as up-to-date. For example, node 106 sets its update flag in nonvolatile memory to false.

In block 614, node 106 advances to an OBSERVER state when it is not in the member list, and the node advances to a PARTICIPANT state when it is in the member list.

Figure 7:
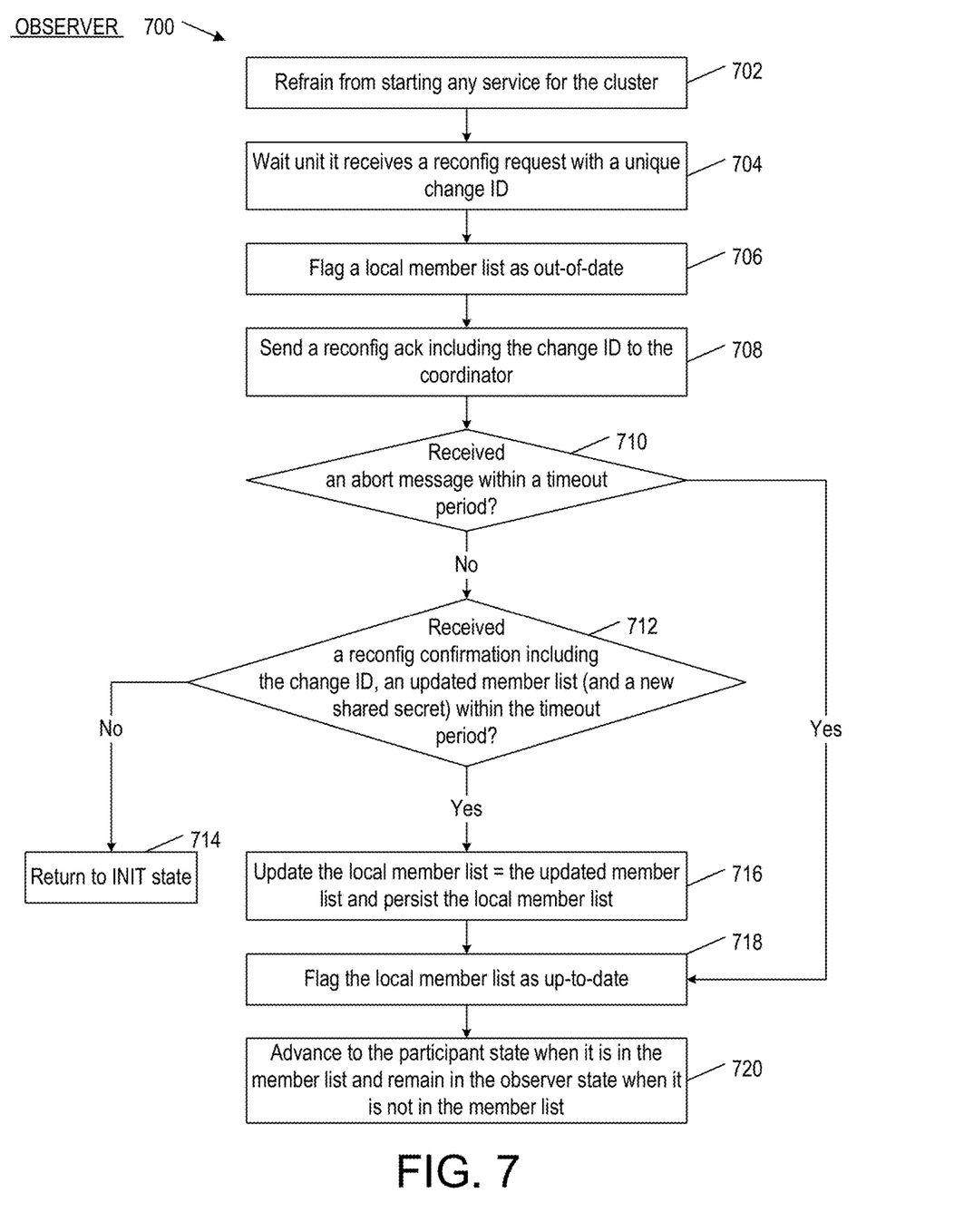
FIG. 7 is a block diagram illustrating a flowchart of a method to implement node 106 of FIGS. 1 and 5 in the OBSERVER state in some examples of the present disclosure.

FIG. 7 is a block diagram illustrating a flowchart of a method 700 to implement node 106 (FIGS. 1 and 5) in the OBSERVER state in some examples of the present disclosure. Method 700 may begin in block 702.

In block 702, node 106 refrains from starting or participating in any cluster related service. Block 702 may be followed by block 704.

In block 704, node 106 waits until it receives a reconfiguration request including a unique change ID from coordinator 104 (FIGS. 1 and 3). After node 106 receives the reconfiguration request, block 704 may be followed by block 706.

In block 706, node 106 flags the local member list as out-of-date because coordinator 104 is dynamically reconfiguring cluster 108 (FIG. 1). For example, node 106 sets its update flag in nonvolatile memory (e.g., datastore 208 in FIG. 2) to true. Block 706 may be followed by block 708.

In block 708, node 106 sends a reconfiguration acknowledgement including the change ID to coordinator 104. Block 708 may be followed by block 710.

In block 710, node 106 determines if it has received an abort message including the change ID from coordinator 104 within a timeout period. If not, block 710 may be followed by block 712. Otherwise block 710 may be followed by block 718 when coordinator 104 aborts the current reconfiguration attempt.

In block 712, node 106 determines if it has received a reconfiguration confirmation including the change ID and an updated member list from coordinator 104 within the timeout period. If not, block 712 may be followed by block 714 because the current cluster reconfiguration has failed. Otherwise block 714 may be followed by block 716 because the current cluster reconfiguration has succeeded.

In block 714, node 106 returns to the INIT state and method 700 ends.

In block 716, node 106 updates the local member list to be equal to the updated member list and persists the local member list to nonvolatile memory (e.g., datastore 208 in FIG. 2). Block 716 may be followed by block 718.

In block 718, node 106 flags the local member list as up-to-date because the cluster reconfiguration attempt was successful. For example, node 106 sets its update flag in nonvolatile memory to false. Block 718 may be followed by block 720.

In block 720, node 106 advances to an OBSERVER state when it is not in the member list, and advances to a PARTICIPANT state when it is in the member list. If node 106 reaches block 720 from block 710 (as a result of receiving the abort message from coordinator 104), the node would remain in the OBSERVER state because the member list does not change when cluster reconfiguration is aborted. Block 720 may end method 700.

Figure 8:
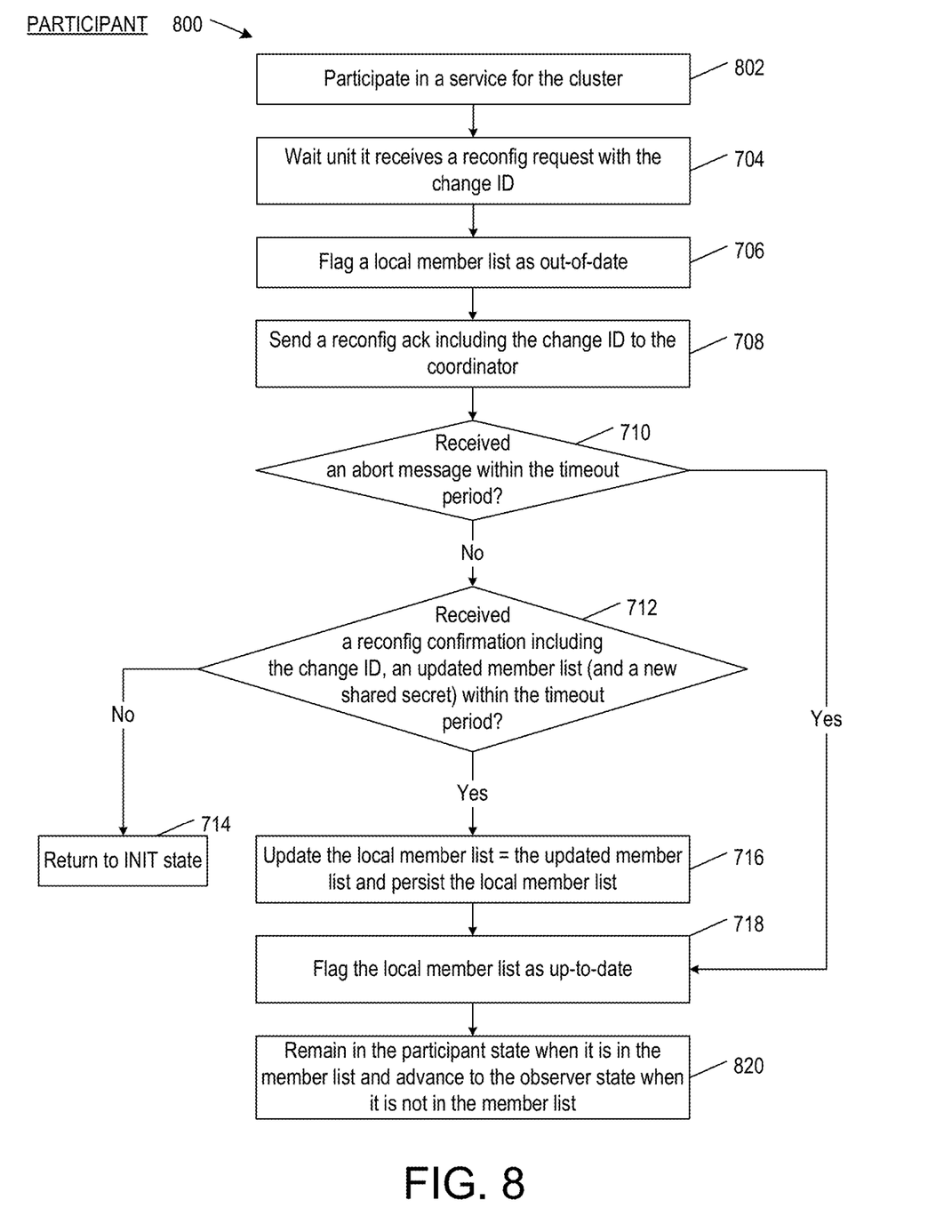
FIG. 8 is a block diagram illustrating a flowchart of a method to implement node 106 of FIGS. 1 and 5 in the PARTICIPANT state in some examples of the present disclosure.

FIG. 8 is a block diagram illustrating a flowchart of a method 800 to implement node 106 (FIGS. 1 and 5) in the PARTICIPANT state in some examples of the present disclosure. Method 800 uses some of the same blocks in method 700 (FIG. 7). Method 800 may begin in block 802.

In block 802, node 106 starts or participates in one or more cluster related services. Block 802 may be followed by block 704.

In block 704, node 106 waits until it receives a reconfiguration request including a unique change ID from coordinator 104 (FIGS. 1 and 3). After node 106 receives the reconfiguration request, block 704 may be followed by block 706.

In block 706, node 106 flags the local member list as out-of-date because coordinator 104 is dynamically reconfiguring cluster 108 (FIG. 1). For example, node 106 sets update flag in nonvolatile memory (e.g., datastore 208 in FIG. 2) to true. Block 706 may be followed by block 708.

In block 708, node 106 sends a reconfiguration acknowledgement including the change ID to coordinator 104. Block 708 may be followed by block 710.

In block 710, node 106 determines if it has received an abort message including the change ID from coordinator 104 within a timeout period. If not, block 710 may be followed by block 712 when coordinator 104 aborts the current reconfiguration attempt. Otherwise block 710 may be followed by block 718.

In block 712, node 106 determines if it has received a reconfiguration confirmation including the change ID and an updated member list from coordinator 104 within the timeout period. If not, block 712 may be followed by block 714 because the current cluster reconfiguration has failed. Otherwise block 714 may be followed by block 716 because the current cluster reconfiguration has succeeded.

In block 714, node 106 returns to the INIT state and method 800 ends.

In block 716, node 106 updates the local member list to be equal to the updated member list and persists the local member list to nonvolatile memory (e.g., datastore 208 in FIG. 2). Block 716 may be followed by block 718.

In block 718, node 106 flags the local member list is up-to-date because the cluster reconfiguration attempt was successful. For example, node 106 sets its update flag in nonvolatile memory to false. Block 718 may be followed by block 820.

In block 820, node 106 advances to an OBSERVER state when it is not in the member list, and the node advances to a PARTICIPANT state when it is in the member list. If node 106 reaches block 820 from block 710 (as a result of receiving the abort message from coordinator 104), the node would remain in the PARTICIPANT state because the member list does not change when cluster reconfiguration is aborted. Block 820 may end method 800.

Although a node removed from cluster 108 (FIG. 1) should be deleted and not restarted, it is possible that the node may be kept alive or restarted by some operational errors. If this "zombie" node is updating its local member list (i.e., its update flag in nonvolatile memory is set true), it is harmless to cluster 108 because the zombie node will stay in the INIT state or advance to the OBSERVER state if it can get the member list from coordinator 104 (FIG. 1). However, if the zombie node is not updating its local member list (i.e., the update flag in nonvolatile memory is set false), it will use an outdated local member list that is out of sync with the member list and may join cluster 108 if it finds itself in the outdated local member list.

To block these zombie nodes from cluster 108, coordinator 104 will not only push the member list to all the nodes 106 in the member list but also a shared secret for secured connections between the nodes in member list. Typically, cluster nodes use secret connections (e.g., encrypted tunnels) with each other and the secured connections use a shared secret for authentication, encryption, or a combination thereof. Coordinator 104 changes the shared secret and pushes a new shared secret whenever it sends the updated member list to the nodes in the node list. For example, if nodes 106 use SSL certificates, then coordinator 106 updates the SSL certificate map according to the updated member list. As any zombie node's certificate would be removed from the updated member list when it is deleted from cluster 108, the zombie node will use an out-of-date shared secret and cannot talk to nodes 106 in the cluster.

In this respect, block 402 in FIG. 4 would include coordinator 104 providing a shared secret along a member list to all the nodes in the node list, and block 414 in FIG. 4 would include coordinator 104 sending a new shared secret with an updated member list. Block 608 in FIG. 6 would include node 106 receiving a shared secret with a member list, and block 712 in FIGS. 7 and 8 would include node 106 receiving a new shared secret and an updated member list. Nodes 106 would use the shared secret to establish secured connections with the other nodes in cluster 108.

All nodes 106 can update their membership view in a consistent way if no errors happen during the reconfiguration process. Furthermore, nodes 106 can handle failures during the reconfiguration process. If a node fails when reconfiguration is ongoing, many cases are possible.

1. A node 106 fails before sending a reconfiguration acknowledgement to coordinator 104. The reconfiguration process fails because coordinator 104 does not receive reconfiguration acknowledgements from all the nodes 106 in the node list within a timeout period. The failed node 106 would get the current member list from coordinator 104 when it recovers.

2. A node 106 fails after it send the reconfiguration acknowledgment to coordinator 104 before the reconfirmation process completes so node 106 does not have the updated member list and its update flag is set to true. Coordinator 104 may determine the reconfiguration process to be successful if all other nodes 106 also sent their reconfiguration acknowledgements. The failed node 106 would get the current member list from coordinator 104 when it recovers (restarts) in the INIT state.

3. A node 106 disconnects with coordinator 104 during the reconfiguration process and jumps back to the INIT state. Such node 106 would wait until it gets the current member list from coordinator 104 when the network recovers.

As shown above, a node 106 would not use any out-of-date member list when it fails or is partitioned from coordinator 104. If a node 106 fails after it updates the local member list to equal the updated member list but before it sets its update flag to false, it would restart in the INIT state and wait for the current member list from coordinator 104. If a node 106 fails after sets its update flag to false, it would restart in the INIT state and uses the local member list without waiting for the current member list from coordinator 104.

Coordinator 104 is a single node role in this cluster protocol. However, coordinator 104 is only needed when reconfiguration is needed or a node 106 is blocked in an incomplete reconfiguration process. Normally nodes 106 do not need to communicate with coordinator 104. Even if coordinator 104 fails, nodes 106 still can be safely restarted without any problem.

When coordinator 104 fails during a reconfiguration process, many nodes 106 may be affected and they may jump back to the INIT state to wait the coordinator to recover. To address this problem, a backup coordinator 105 (FIG. 1) is provided in some examples of the present disclosure. When primary coordinator 104 updates the member list, it synchronizes the member list to backup coordinator 105. Backup coordinator 105 monitors primary coordinator 104. When primary coordinator 104 fails, backup coordinator 105 does not take over the reconfiguration process because it complicates the protocol. Instead, backup coordinator 105 provide the member list to all the nodes 106 in the member list when it detects primary coordinator 104 has failed. All the nodes 106 hanging in the INIT state during the previous reconfiguration process can safely recover with a consistent membership. When primary coordinator 104 recovers, it still can start a new reconfiguration process without synchronizing state with backup coordinator 105.

In this respect, block 412 in FIG. 4 would include coordinator 104 synchronizing the updated member list with backup coordinator 105.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method for a node to become a member of a cluster, comprising:
when the node is in an initialization state:
refraining from starting any cluster related service;
rejecting any reconfiguration request from a coordinator of the cluster;
prior to receiving a member list, determining if a local copy of the member list is out-of-date based on an update flag persisted by the node, nodes in the member list being members of the cluster;
when the local copy of the member list is out-of-date:
waiting to receive the member list;
when the node receives the member list, updating the local copy of the member list to be equal to the member list;
persisting the local copy of the member list; and
recording the local copy of the member list as up-to-date;
advancing to an observer state when the node is not in the member list; and
advancing to a participant state when the node is in the member list;
when the local copy of the member list is up-to-date:
advancing to the observer state when the node is not in the member list; and
advancing to the participant state when the node is in the member list.

2. The method of claim 1, prior to waiting to receive the member list, further comprising sending a request for the member list to the coordinator.

3. The method of claim 1, wherein the node, in the initialization state, receives the member list from the coordinator or a backup coordinator.

4. The method of claim 1, further comprising:
when the node is in the observer state, refraining from starting any cluster related service; and
when the node is in the participant state, participate in a cluster related service.

5. The method of claim 4, further comprising, when the node is in the observer state or the participant state:
when the node receives a reconfiguration request including a unique change identifier (ID) from the coordinator:
recording the local copy of the member list as out-of-date;
sending a reconfiguration acknowledgement including the unique change ID to the coordinator;
when the node receives an abort message from the coordinator within a timeout period:
recording the local copy of the member list as up-to-date; and
remaining in the node's present state;
when the node does not receive a reconfiguration confirmation including the unique change ID and an updated member list from the coordinator within the timeout period, returning to the initialization state;
when the node receives the reconfiguration confirmation including the unique change ID and the updated member list from the coordinator within the timeout period:
updating the local copy of the member list to be equal to the updated member list;
persisting the local copy of the member list;
recording the local copy of the member list as up-to-date;
advancing to or remaining in the observer state when the node is not in the member list; and
advancing to or remaining in the participant state when the node is in the member list.

6. The method of claim 5, further comprising:
receiving a shared secret for secured connections between the nodes in the member list when the node receives the member list; and
receiving a new shared secret for the secured connections between nodes in the updated member list when the node receives the reconfiguration confirmation including the unique change ID and the updated member list.

7. The method of claim 5, further comprising recording the local copy of the member list as out-of-date when the node first starts.

8. A computer system, comprising:
a node that is or wish to be a member of the cluster, the node being configured to:
when the node is in an initialization state:
prior to receiving a member list, determining if a local copy of the member list is out-of-date based on an update flag persisted by the node, nodes in the member list being members of the cluster;
when the local copy of the member list is out-of-date:
when the node receives the member list, updating the local copy of the member list to be equal to the member list;
persisting the local copy of the member list; and
recording the local copy of the member list as up-to-date;
when the node is not in the member list, advancing to an observer state; and
when the node is in the member list, advancing to a participant state.

9. The computer system of claim 8, wherein the node is further configured to:
when the node is in the observer state, refrain from starting any cluster related service; and
when the node is in the participant state, participate in a cluster related service.

10. The computer system of claim 8, wherein the node is further configured to, when the node is in the observer state or the participant state:
when the node receives a reconfiguration request to change a membership of the cluster from a coordinator for managing the membership of the cluster, the reconfiguration request including a unique change ID:
record the local copy of the member list as out-of-date;
send a reconfiguration acknowledgement including the unique change ID to the coordinator;
when the node receives an abort message from the coordinator within a timeout period:
record the local copy of the member list as up-to-date; and
remain in the node's present state;
when the node does not receive a reconfiguration confirmation including the unique change ID and the updated member list from the coordinator within the timeout period, return to the initialization state;
when the node receives the reconfiguration confirmation including the unique change ID and the updated member list from the coordinator within the timeout period:
update the local copy of the member list to be equal to the updated member list;
persist the local copy of the member list;
record the local copy of the member list as up-to-date;
advance to or remain in the observer state when the node is not in the member list; and
advance to or remain in the participant state when the node is in the member list.

11. The computer system of claim 10, wherein the node is further configured to:
receive a shared secret for secured connections between the nodes in the member list when the node receives the copy of the member list; and
receive a new shared secret for the secured connections between nodes in the updated member list when the node receives the reconfiguration confirmation including the unique change ID and the updated member list.

12. The computer system of claim 10, wherein the node further configured to record the local copy of the member list as out-of-date when the node first starts.

13. The computer system of claim 10, further comprising: the coordinator being configured to:
when the coordinator is in a stable state:
push the member list to any node in a node list, nodes in the node list being or wishing to be the members of the cluster;
periodically determine if the node list is equal to the member list; and
when the node list is not equal to the member list, advance to a reconfiguration state to change the membership of the cluster;
when the coordinator is in the reconfiguration state:
send the reconfiguration request including the unique change ID to the nodes in the node list;
when reconfiguration acknowledgements with the unique change ID are received from all the nodes in the node list within the timeout period:
update the member list to be equal to the node list;
persist the updated member list;
after the updated member list is persisted:
send the reconfiguration confirmation including the unique change ID and the updated member list to all the nodes in the node list; and
return to the stable state.

14. The computer system of claim 13, wherein the coordinator is further configured to:
when pushing the member list to any node in the node list, further provide a shared secret for secured connections between the nodes in the member list; and
when sending the reconfiguration confirmation, further provide a new shared secret for the secured connections between nodes in the updated member list.

15. The computer system of claim 13, further comprising a backup coordinator, wherein:
the coordinator is further configured to synchronize the updated member list with the backup coordinator; and
the backup coordinator is configured to monitor the coordinator and push the updated member list to all the nodes in the member list when the backup coordinator detects the coordinator has failed.

16. A non-transitory, computer-readable storage medium encoded with instructions executable by a processor to implement a node to be part of a cluster, the instructions comprising:
when the node is in an initialization state:
prior to receiving a member list, determining if a local copy of the member list is out-of-date based on an update flag persisted by the node, nodes in the member list being members of the cluster;
when the node is out-of-date:
when the node receives the member list, updating the local copy of the member list to be equal to the member list;
persisting the local copy of the member list; and
recording the local copy of the member list as up-to-date;
advancing to an observer state when the node is not in the member list; and
advancing to a participant state when the node is in the member list;
when the node is up-to-date:
advancing to the observer state when the node is not in the member list; and
advancing to the participant state when the node is in the member list.

17. The non-transitory, computer-readable storage medium of claim 16, wherein the instructions further comprise, prior to waiting to receive the member list, sending a request for the member list to the coordinator.

18. The non-transitory, computer-readable storage medium of claim 16, wherein the instructions further comprise:
when the node is in the observer state, refraining from starting any cluster related service; and
when the node is in the participant state, participating in a cluster related service.

19. The non-transitory, computer-readable storage medium of claim 16, wherein the instructions further comprise, when the node is in the observer state or the participant state:
when the node receives a reconfiguration request including a unique change ID from the coordinator:
recording the local copy of the member list as out-of-date;
sending a reconfiguration acknowledgement including the unique change ID to the coordinator;
when the node receives an abort message from the coordinator within a timeout period:
recording the local copy of the member list as up-to-date; and
remaining in the node's present state;
when the node does not receive a reconfiguration confirmation including the unique change ID and an updated member list from the coordinator within the timeout period, returning to the initialization state;

when the node receives the reconfiguration confirmation including the unique change ID and the updated member list from the coordinator within the timeout period:

updating the local copy of the member list to be equal to the updated member list;

persisting the local copy of the member list;

recording the local copy of the member list as up-to-date;

advancing to or remaining in the observer state when the node is not in the member list; and advancing to or remaining in the participant state when the node is in the member list.

20. The non-transitory, computer-readable storage medium of claim 19, wherein the instructions further comprise:

receiving a shared secret for secured connections between the nodes in the member list when the node receives the member list; and receiving a new shared secret for the secured connections between nodes in the updated member list when the node receives the reconfiguration confirmation including the unique change ID and the updated member list.

21. The non-transitory, computer-readable storage medium of claim 20, wherein the instructions further comprise recording the local copy of the member list as out-of-date when the node first starts.

* * * * *